(12) United States Patent
Sturkovich et al.

(10) Patent No.: US 9,071,393 B2
(45) Date of Patent: Jun. 30, 2015

(54) HITLESS MODULATION CHANGES IN DOUBLE CAPACITY LINKS USING ADAPTIVE CODING MODULATION (ACM)

(71) Applicant: Broadcom Corporation, Irvine, CA (US)

(72) Inventors: Kobi Sturkovich, Netanya (IL); Igal Kushnir, Azur (IL)

(73) Assignee: Broadcom Corporation, Irvine, CA (US)

( * ) Notice: Subject to any disclaimer, the term of this patent is extended or adjusted under 35 U.S.C. 154(b) by 61 days.

(21) Appl. No.: 13/733,519

(22) Filed: Jan. 3, 2013

(65) Prior Publication Data

US 2014/0185704 A1    Jul. 3, 2014

(51) Int. Cl.
    *H04L 1/00* (2006.01)
(52) U.S. Cl.
    CPC ............ *H04L 1/0009* (2013.01); *H04L 1/0003* (2013.01); *H04L 2001/0096* (2013.01)
(58) Field of Classification Search
    CPC ....... H04L 27/02; H04L 27/34; H04L 27/368; H04L 5/143; H04L 5/1461; H04L 1/0003; H04L 1/0009; H04L 2001/0096; H04B 7/155; H04B 1/38
    See application file for complete search history.

(56) References Cited

U.S. PATENT DOCUMENTS

| | | | | |
|---|---|---|---|---|
| 7,839,952 | B2 * | 11/2010 | Sofer et al. ..................... | 375/299 |
| 8,385,921 | B1 * | 2/2013 | Shousterman et al. ........ | 455/442 |
| 2005/0101349 | A1 * | 5/2005 | Pihlajamaa et al. .......... | 455/557 |
| 2012/0207022 | A1 * | 8/2012 | Grayson et al. ............... | 370/235 |
| 2013/0135985 | A1 * | 5/2013 | Friedmann et al. ........... | 370/216 |
| 2013/0135986 | A1 * | 5/2013 | Sturkovich et al. ........... | 370/216 |
| 2013/0136039 | A1 * | 5/2013 | Sturkovich et al. ........... | 370/280 |
| 2013/0185617 | A1 * | 7/2013 | Roh et al. ...................... | 714/800 |

* cited by examiner

*Primary Examiner* — Kenneth Lam
(74) *Attorney, Agent, or Firm* — Sterne, Kessler, Goldstein & Fox P.L.L.C.

(57) ABSTRACT

An outdoor communication unit (ODU) for implementation within a dual channel microwave backhaul system, is provided. The ODU includes an radio frequency (RF) module, having digital capabilities, which is configured to utilize the digital capabilities to perform adaptive adjustments to correct errors in data in a digital domain, a conversion block configured to convert the data between an analog domain and the digital domain, and a processing module configured to adaptively adjust a characteristic of the data and a characteristic of a dual channel wireless link, and to facilitate a transmission of the data over the dual channel wireless link by performing mathematical manipulation techniques. In particular, the characteristic of the data and of the dual channel wireless link are adaptively adjusted, according to a detected condition, using a hitless adaptive coding modulation (ACM) technique to optimize the transmission of the data over the dual channel wireless link.

21 Claims, 10 Drawing Sheets

HITLESS MODULATION CHANGES IN DOUBLE CAPACITY LINKS USING ADAPTIVE CODING MODULATION (ACM)

BACKGROUND OF THE DISCLOSURE

1. Field of the Disclosure

The disclosure generally relates to point-to-point (PtP) wireless links, and more specifically to an Adaptive Coding Modulation (ACM) system that provides hitless modulation changes in double capacity links.

2. Related Art

Traditionally, the majority of consumer demand in the area of mobile backhaul networking has been directed to voice services. However, recently the market for mobile backhaul services has begun to change. In particular, the mobile backhaul space is experiencing a growing demand for increased capacity as well as a shift from voice services to data services. These factors are driving mobile backhaul networks towards high capacity Internet Protocol (IP)/Ethernet connections.

Similarly, mobile backhaul networking is experiencing a transition to fourth generation (4G) standard and Long Term Evolution (LTE) networks. This transition is also driving the need for higher capacity, and is moving more packet traffic onto mobile backhaul networks.

In an effort to meet the growing demand for increased capacity, mobile backhaul networks have begun to implement systems that can handle double capacity communications. For example, some mobile backhaul networks have begun to carry out communications using cross polarization (XPIC), spatial multiplexing, and/or multiple-input multiple-output (MIMO) techniques. However, these double capacity communication techniques are generally implemented using two completely independent channels, where each channel typically utilizes its own Adaptive Coding Modulation (ACM) scheme. Therefore, these conventional double capacity communication techniques are unable to perform system optimization techniques, which often results in inefficient communication (i.e. link unavailability).

Additionally, there is a problem associated with communicating over wireless links. Specifically, in wireless connections, unlike wired connections, such as fiber optic cable, or copper cable, to provide some examples, link capacity may change for various reasons including, but not limited to, environmental conditions. Therefore, as mobile backhaul networks continue to transition to 4G and LTE networks, and as systems rely more and more on these wireless links, it is increasingly becoming a problem to cope with these changing link conditions while also meeting the growing demand for increased capacity.

Thus, conventional mobile backhaul networks do not effectively cope with these changing link conditions, nor are they able to effectively meet the increasing demands for capacity.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 6A:
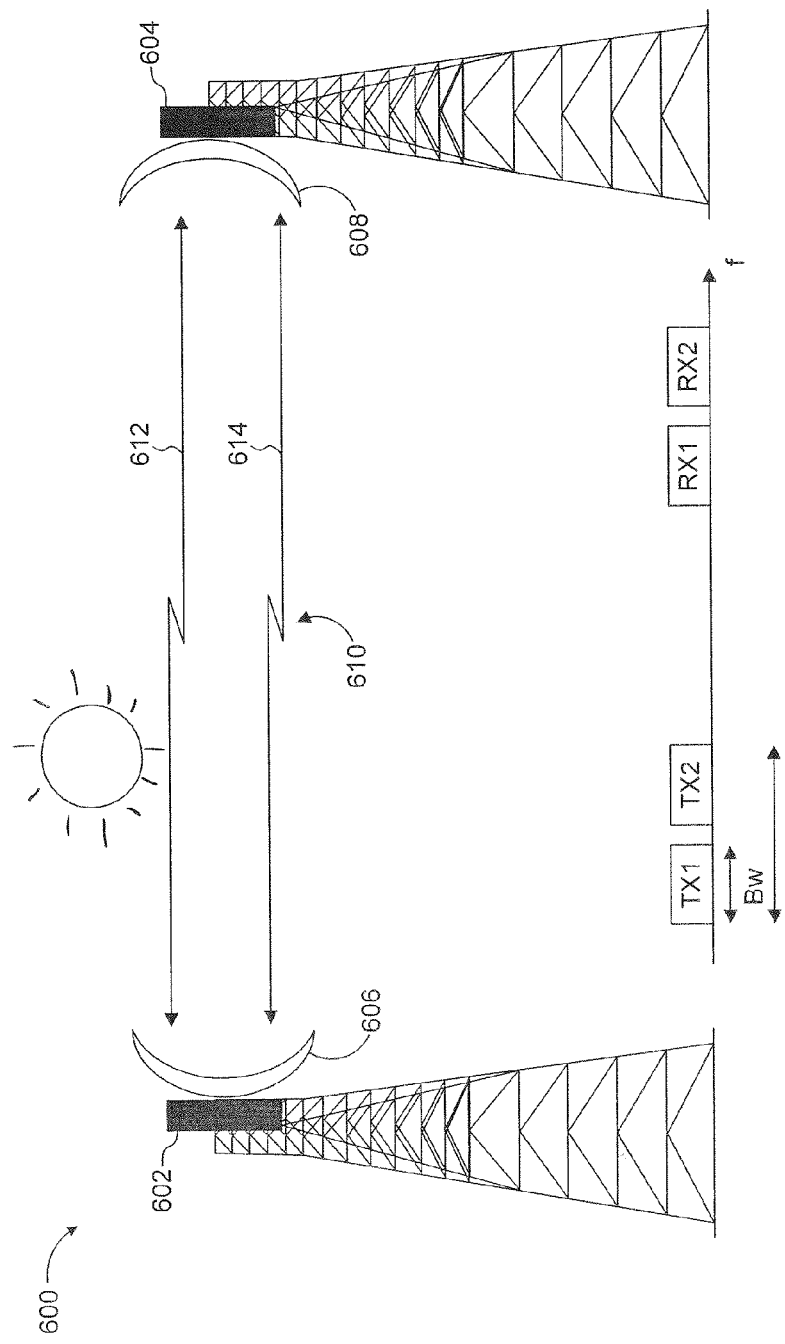
FIG. 6A illustrates a block diagram of a dual channel wireless link supported by a microwave backhaul system, and operating in the presence of good external conditions, according to an exemplary embodiment of the present disclosure.
Figure 6B:
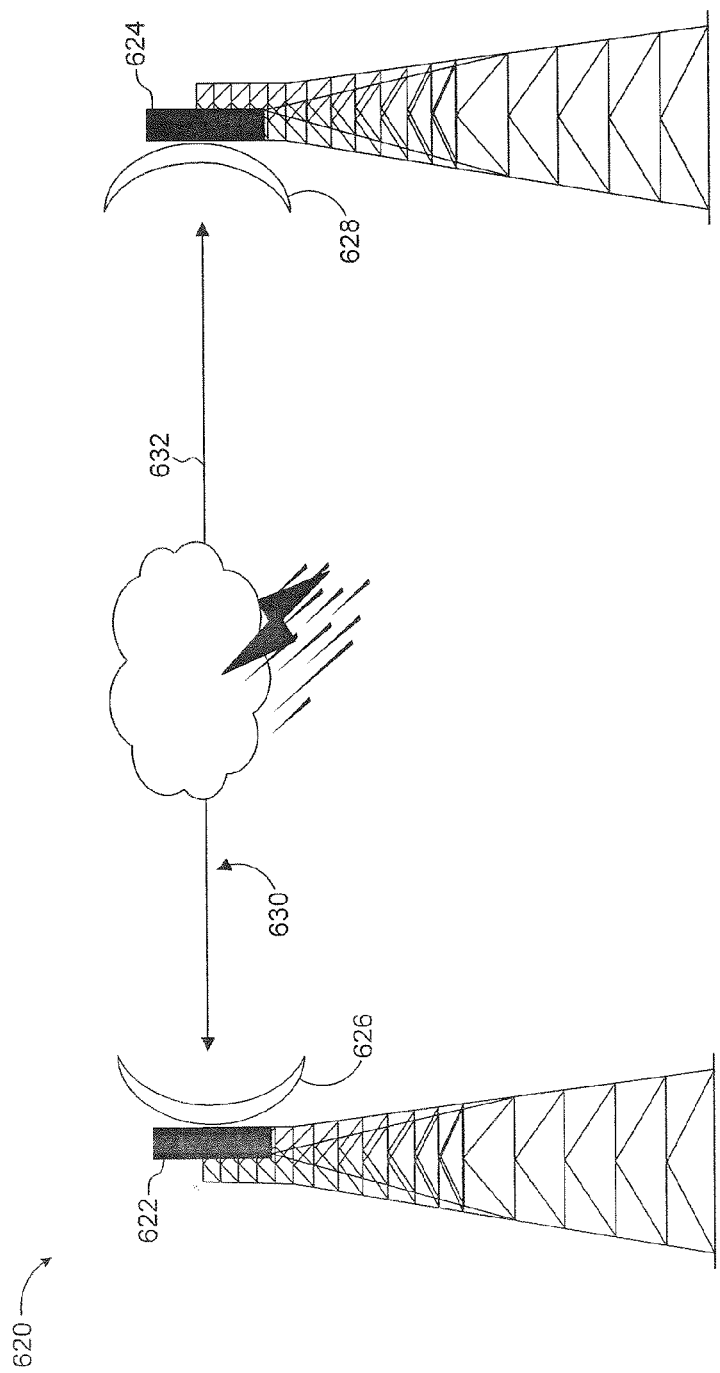
Figure 7:
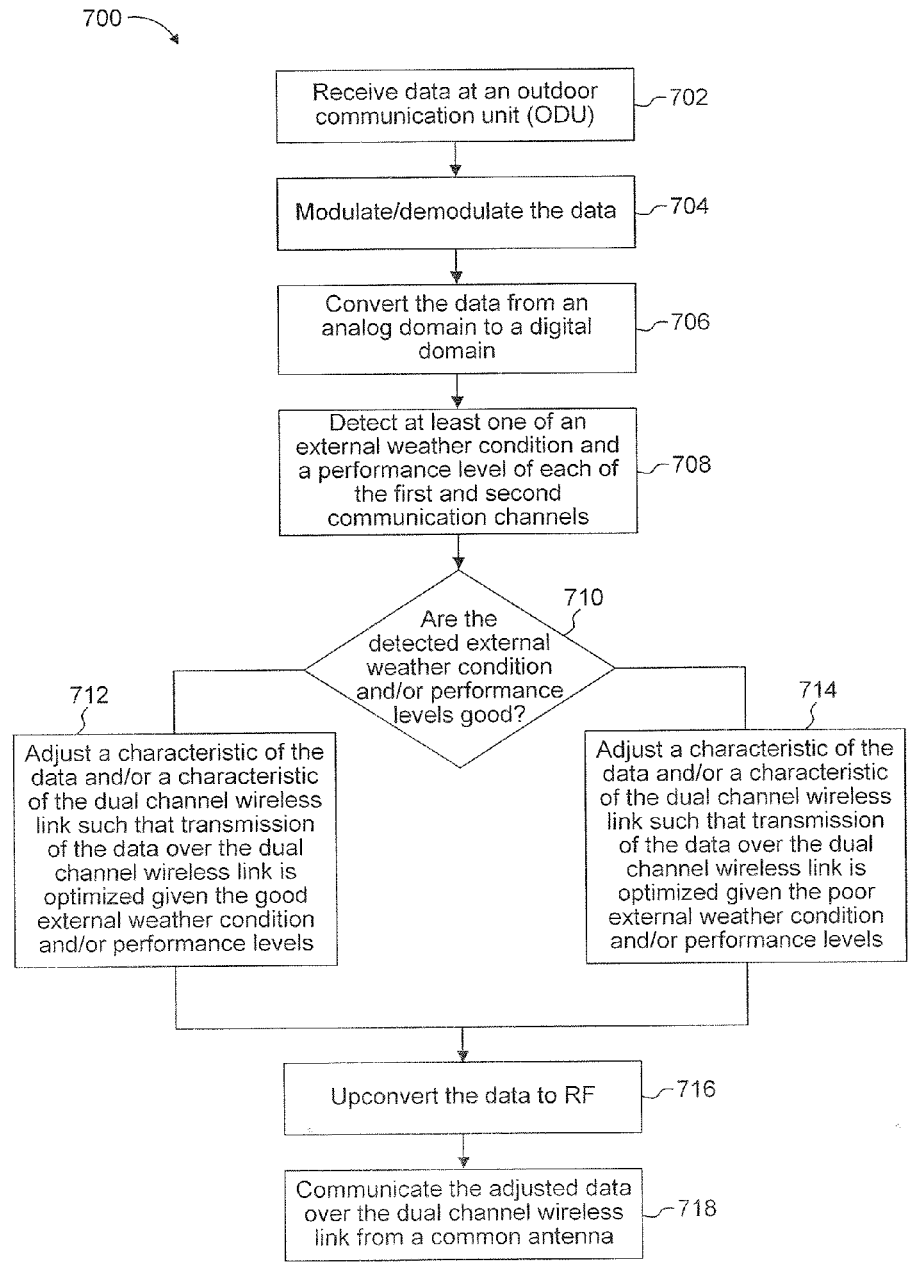

FIG. 6B illustrates a block diagram of a dual channel wireless link supported by a microwave backhaul system, and operating in the presence of poor external conditions, according to an exemplary embodiment of the present disclosure; and FIG. 7 is a flowchart of exemplary operational steps of optimizing a transmission of data over a dual channel wireless link in response to changing external conditions according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

An Exemplary Split ODU Microwave Backhaul System

Figure 1A:
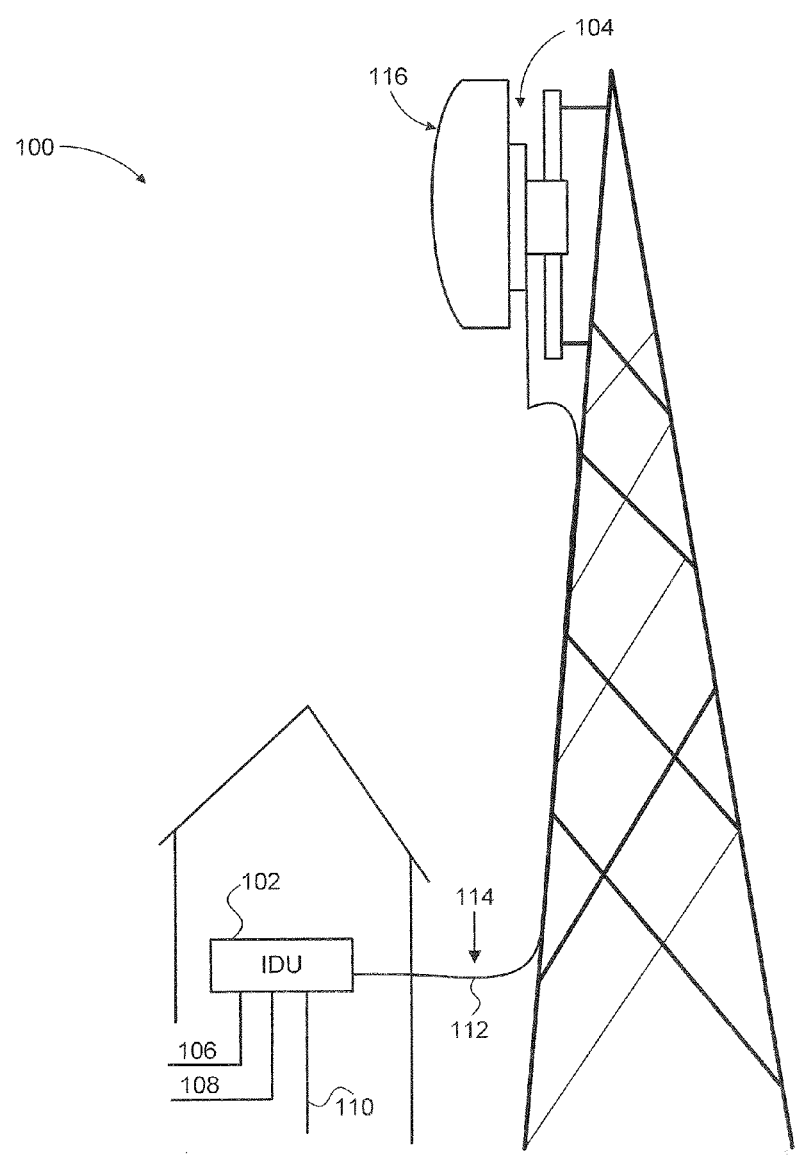
FIG. 1A illustrates a block diagram of a split outdoor communication unit (ODU) microwave backhaul system according to an exemplary embodiment of the present disclosure.

FIG. 1A illustrates a block diagram of a split outdoor communication unit (ODU) microwave backhaul system 100 that includes an indoor communication unit (IDU) 102 and an ODU 104 according to an exemplary embodiment of the present disclosure. Microwave communications, as used throughout this disclosure, refers to both terrestrial point-to-point (PtP) radio communications, as well as point-to-multi-point communications, and can include both wired and/or wireless communications.

Split ODU microwave backhaul system 100 initiates communication by accessing an information source, which can comprise, for example, audio data 106, video data 108, or any other data capable of being transmitted over an Internet Protocol (IP)/Ethernet connection 110. To facilitate this communication, IDU 102 is coupled to a core network (not shown in FIG. 1A). In particular, IDU 102 is configured to acquire one or more sequences of digital data (e.g., audio data 106, video data 108, data transmitted over IP/Ethernet connection 110, or the like) from the core network. IDU 102 can also be configured to support several additional services, such as Ethernet, time-division multiplexing (TDM), and control data that is aggregated over a radio link.

IDU 102 can be implemented at a location that is substantially removed from ODU 104, such as at a location at ground level. For example, IDU 102 can be positioned inside of a home or an office building, or the like. Conversely, ODU 104 can be implemented at a substantially elevated location, such as on top of a pole, on top of an antenna tower, on top of a building, or the like. In some embodiments, IDU 102 and ODU 104 can be separated by a distance up to approximately 300 meters; however other distances are possible.

IDU 102 and ODU 104 are connected via a communication pathway 112, which is configured such that data 114 can be transmitted between IDU 102 and ODU 104. Communication pathway 112 can comprise an Ethernet cable, a fiber optic cable, a coaxial cable, an intermediate frequency (IF) cable, a twisted pair cable, a shielded cable, a category 5 cable, a category 6 cable, or one or more copper wires, to provide some examples. Therefore, depending on a chosen communication medium, communication pathway 112 can facilitate transmission of an analog signal or a digital signal between IDU 102 and ODU 104. In some embodiments, communication pathway 112 can be a wireless communication channel. Additionally, an antenna 116 can be coupled to ODU 104, and can be positioned close to ODU 104. Therefore, split ODU microwave backhaul system 100 is implemented such that data 114 can be transmitted from IDU 102, across communication pathway 112, to ODU 104, and subsequently to antenna 116 where communication over a wireless link can then be initiated. Also, split ODU microwave backhaul system 100 is implemented such that data 114 received by antenna 116 can be transmitted from ODU 104 over communication pathway 112 to IDU 102.

As will be discussed in greater detail below, ODU 104 can be a "smart ODU." For example, ODU 104 can have digital capabilities, which can be implemented to improve the radio frequency (RF) functionalities within ODU 104. In particular, ODU 104 can be configured to substantially remove errors or imperfections from data 114 prior to being transmitted from ODU 104, either over communication pathway 112 or over the wireless link.

In some situations, ODU 104 may not include all of the functionalities of a modem, which can instead be completely implemented within IDU 102 or split between the IDU 102 and ODU 104. Therefore, when ODU 104 is implemented as a "smart ODU," split ODU microwave backhaul system 100 can provide more efficient communication both between IDU 102 and ODU 104, as well as over the wireless link. The limitations generally associated with the transmission of data in conventional split ODU configurations are eliminated because of the digital capabilities, and the corresponding improved RF functionalities, of ODU 104. For example, ODU 104 can sample data 114 received from IDU 102 and then correct any detected errors (e.g. by removing noise from data 114), which may be associated with either the IDU 102 or the communication pathway 112. ODU 104 can then process data 114 such that it can be properly transmitted over the wireless link via antenna 116.

As will also be discuss in greater detail below, the wireless link can be a dual channel wireless link, and thus can support approximately double the capacity of a wireless link associated with a conventional split ODU configuration. For example, ODU 104 can be implemented such that two channels can be substantially simultaneously transmitted from, and received at, ODU 104 over the wireless link. Therefore, ODU 104, supporting the dual channel wireless link, may eliminate the need to add a second ODU to meet increasing demands for capacity. In particular, when ODU 104 is implemented to support two communication channels, thus approximately doubling the capacity of the wireless link, split ODU microwave backhaul system 100 can effectively meet the demands required by high capacity IP/Ethernet connections and 4G and LTE networks.

In an embodiment, ODU 104 can also correct errors associated with a signal received over the wireless link via antenna 116. ODU 104 can then process the signal such that it can be properly transmitted over communication pathway 112 to IDU 102. As will as be discussed in greater detail below, split ODU microwave backhaul system 100 can also be configured to support an adaptive coding and modulation (ACM) scheme that allows for modulation changes, without incurring significant signal losses (e.g. hitless modulation changes), in the wireless link in response to varying external conditions. In particular, implementing hitless ACM provides for high reliability of split ODU microwave backhaul system 100 even in extreme weather conditions, such as wind, rain, hail, or the like.

An Exemplary all ODU Microwave Backhaul System

Figure 1B:
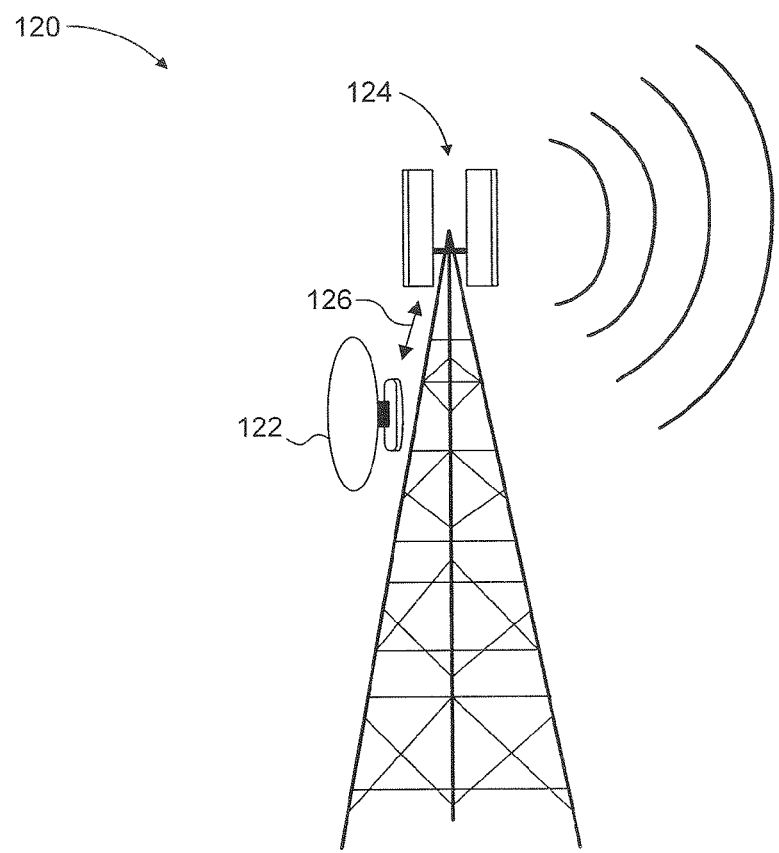
FIG. 1B illustrates a block diagram of an all ODU microwave backhaul system according to an exemplary embodiment of the present disclosure.

FIG. 1B illustrates a block diagram of an all ODU microwave backhaul system 120 that includes only an ODU 122 according to an exemplary embodiment of the present disclosure. Therefore, in contrast to split ODU microwave backhaul system 100 (see FIG. 1A), all ODU microwave backhaul system 120 does not include an IDU.

Similar to split ODU microwave backhaul system 100, all ODU microwave backhaul system 120 initiates communication by accessing an information source. However, to facilitate this communication in all ODU microwave backhaul system 120, ODU 122 is coupled to the core network (not shown in FIG. 1B). Therefore, ODU 122 is configured to acquire one or more sequences of digital data (e.g., audio data 106, video data 108, data transmitted over IP/Ethernet connection 110, or the like) directly from the core network. As with IDU 102 (see FIG. 1A), ODU 122 can also be configured to support several additional services, such as Ethernet, time-division multiplexing (TDM), and control data that is aggregated over a radio link.

In some embodiments, ODU 122 can be implemented at a substantially elevated location, such as on top of a pole, on top of an antenna tower, on top of a building, or the like. Additionally, an antenna 124 can be coupled to ODU 122, and can be positioned close to ODU 122. Therefore, all ODU microwave backhaul system 120 is implemented such that data 126 can be transmitted from ODU 122 to antenna 124, where communication over a wireless link can then be initiated. Also, all ODU microwave backhaul system 120 is implemented such that data 126 received over the wireless link by antenna 124 can be transmitted to ODU 122.

As similarly discussed above with reference to ODU 104 (see FIG. 1A), ODU 122 can also be a "smart ODU." For example, ODU 122 can have digital capabilities, which can be implemented to improve the radio frequency (RF) functionalities within ODU 122. In particular, ODU 122 can be configured to substantially remove errors or imperfections from data 126 prior to being transmitted from ODU 122. Therefore, when ODU 122 is implemented as a "smart ODU," all ODU microwave backhaul system 120 can provide for more efficient communication over the wireless link. The limitations generally associated with the transmission of data in conventional all ODU configurations are eliminated because of the digital capabilities, and the corresponding improved RF functionalities, of ODU 122. In an embodiment, ODU 122 can also correct errors associated with a signal received over a wireless link via antenna 124. ODU 122 may also be configured to digitally process data 126 such that it can be properly transmitted over the wireless link via antenna 124.

Similar to the wireless link associated with split ODU microwave backhaul system 100, the wireless link associated with all ODU microwave backhaul system 120 can be a dual channel wireless link, and thus can support approximately double the capacity of a wireless link associated with a conventional all ODU configuration. For example, ODU 122 can be implemented such that two channels can be substantially simultaneously transmitted from, and received at, ODU 122 over the wireless link. Therefore, ODU 122 may eliminate the need to add a second ODU to meet increasing demands for capacity. In particular, when ODU 122 is implemented to support two communication channels, split ODU microwave backhaul system 120 can effectively meet the demands required by high capacity IP/Ethernet connections and 4G and LTE networks.

All ODU microwave backhaul system 120 can also be configured to support an adaptive coding and modulation (ACM) scheme that allows for hitless modulation changes in the wireless link in response to varying external conditions. In particular, implementation of hitless ACM provides for high reliability of all ODU microwave backhaul system 120 even in extreme weather conditions, such as wind, rain, hail, or the like.

Although the description of the split ODU and all ODU configurations are to be described in terms of microwave backhaul architecture, those skilled in the relevant art(s) will recognize that the present disclosure can be applicable to other architectures without departing from the spirit and scope of the present disclosure.

An Exemplary Wireless Link Having an Adaptive Bandwidth

Figure 2:
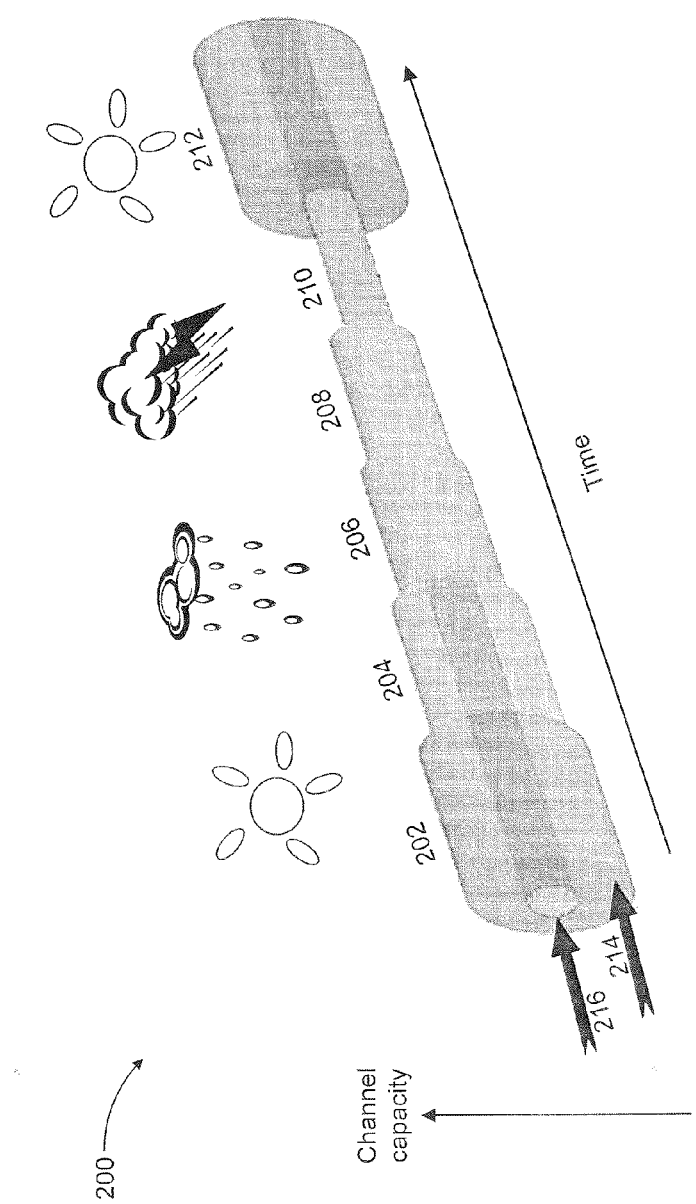
FIG. 2 illustrates a block diagram of a wireless link having a bandwidth that adapts to changing external conditions according to an exemplary embodiment of the present disclosure.

FIG. 2 illustrates a block diagram of a wireless link 200 having a bandwidth that adapts to changing external conditions according to an exemplary embodiment of the present disclosure. Wireless link 200 may represent an exemplary embodiment of the wireless link from FIG. 1A and/or 1B.

In some embodiments, adaptive coding modulation (ACM) may be used to appropriately adjust the bandwidth of wireless link 200 in response to changes in external conditions. Adaptive Coding and Modification (ACM) refers to the automatic adjustment that a wireless system can make in order to optimize over-the-air transmission and prevent weather-related fading from causing communication on the link to be disrupted. When extreme weather conditions, such as a storm, affect the transmission and receipt of data and voice over the wireless network, an ACM-enabled radio system automatically changes modulation and/or coding allowing real-time applications to continue to run uninterrupted. For example, ACM may be implemented to increase a modulation rate of a signal transmitted across wireless link 200 when the external conditions are good (e.g. sunshine and clear skies), and may be implemented to decrease a modulation rate of the signal when the external conditions are poor (e.g. wind, rain, hail, or the like). Therefore, in most instances, this technique allows a signal to be transmitted over wireless link 200 at a high quadrature amplitude modulation (QAM), and only in the situations involving severe link fading will the transmission over wireless link 200 be reduced to a more robust modulation (e.g. quadrature phase-shift keying (QPSK)).

Microwave backhaul architectures that implement ACM may provide several advantages as technology continues to advance. As discussed above, the market for mobile backhaul services has begun to change, and the mobile backhaul space is experiencing a shift from voice services to data services. Accordingly, data services generally do not require as high of link availability as required by voice services. Therefore, in light of this lower link availability requirement, system operators may have more flexibility when dealing with microwave backhaul architectures that implement ACM. In particular, system operators may be afforded a wide range of flexibility to make different trade-offs between system cost, power, and peak to average voltage.

Accordingly, microwave backhaul architectures that implement ACM (e.g. split ODU microwave backhaul system 100 and/or all ODU microwave backhaul system 120) can save hardware costs by eliminating expensive power amplifiers (PAs) and voltage controlled oscillators (VCOs). The elimination of these PAs and VCOs may save approximately $20 from the overall system cost. Additionally, microwave backhaul architectures that implement ACM can save hardware costs by eliminating large (high gain) antennas, which may save approximately $100 from the overall system cost. The only trade-off of this may be that the microwave backhaul architecture may experience a loss of availability. However, this availability loss may only occur under worst case scenarios (e.g. severe weather conditions), and even then, it may only occur for approximately five minutes during the course of an entire year, which would be well within the range of acceptability given the lower link availability requirements associated with data services.

As shown in FIG. 2, wireless link 200 may have different channel capacities at different points in time. In particular, portion 202 of wireless link 200 extends along the vertical axis (y-axis) to a greater extent than portion 210, to provide an example. Therefore, this indicates that the channel capacity (shown on the y-axis of FIG. 2) of wireless link 200 is greater at portion 202 than at portion 210. In fact, FIG. 2 illustrates that as time progresses, wireless link 200 may experience several different external conditions, which may each result in the channel capacity of wireless link 200 being adapted to optimize over-the-air transmission and prevent weather-related fading from causing communication on wireless link 200 to be disrupted.

Accordingly, at portion 202, wireless link 200 may be experiencing good external conditions (e.g. sunshine and clear skies). Therefore, at portion 202, wireless link 200 may be adapted to support a relatively high channel capacity. For example, wireless link 200 may have a channel capacity that supports a transmission having a modulation of approximately 4096QAM, or 1024QAM. At portion 204, wireless link 200 may begin to experience a change in external conditions (e.g. a change from sunshine and clear skies to wind and rain or the like). Therefore, at portion 204, wireless link 200 may be adapted to support a lower channel capacity than the channel capacity in portion 202. For example, wireless link 200 may have a channel capacity that supports a transmission having a modulation of approximately 256QAM, or 128QAM. At portion 206, wireless link 200 may be experiencing moderate external conditions (e.g. wind, rain, or the like). Therefore, at portion 206, wireless link 200 may be adapted to support a lower channel capacity than the channel capacity in portion 204. For example, wireless link 200 may have a channel capacity that supports a transmission having a modulation of approximately 64QAM. At portion 208, wireless link 200 may begin to experience another change in external conditions (e.g. a change from wind and rain to severe storm-like conditions). Therefore, at portion 208, wireless link 200 may be adapted to support a lower channel capacity than the channel capacity in portion 206. For example, wireless link 200 may have a channel capacity that supports a transmission having a modulation of approximately 32QAM. At portion 210, wireless link 200 may be experiencing poor external conditions (e.g. severe storm-like conditions). Therefore, at portion 210, wireless link 200 may be adapted to support its lowest channel capacity. For example, wireless link 200 may have a channel capacity that supports a transmission having a more robust modulation, such as QPSK. Finally, at portion 212, wireless link 200 may again be experiencing good external conditions. Therefore, at portion 212, wireless link 200 may again be adapted to support a relatively high channel capacity.

In some embodiments, each of the external conditions shown at portions 202-212 may represent a single external conditions being experienced by wireless link 200 throughout the entire length of wireless link 200 and/or during the entire duration of communication across wireless link 200. However, wireless link 200 may also experience more than one of the external conditions shown at portions 202-212 across the length of wireless link 200 and/or during the duration of communication across wireless link 200. For example, when wireless link 200 experiences different external conditions at different locations and/or at different points in time, wireless link 200 may be implemented having a channel capacity that supports a transmission that is consistent with the worst external conditions experienced by wireless link 200.

In some embodiments, to ensure that the most crucial information is successfully transmitted across wireless link 200 even when experiencing poor external conditions, the signal that is sought to be transmitted may be categorized as either high-class services 216 or low-/mid-class services 214. Accordingly, high-class services 216 may be given a highest priority such that transmission of high-class services 216 may be carried out even if wireless link 200 only had a channel capacity supporting a relatively low modulation, such as QPSK (see FIG. 2 where high-class services 216 are shown being transmitted at the center of wireless link 200). Alternatively, low-/mid-class services 214 may be given a lower priority such that transmission of low-/mid-class services 214 may only be carried out if wireless link 200 had a channel capacity supporting a relatively high modulation, such as 4096QAM, or 1024QAM, to provide some examples (see FIG. 2 where low-/mid-class services 214 are shown being transmitted at the periphery of wireless link 200).

Figure 3A:
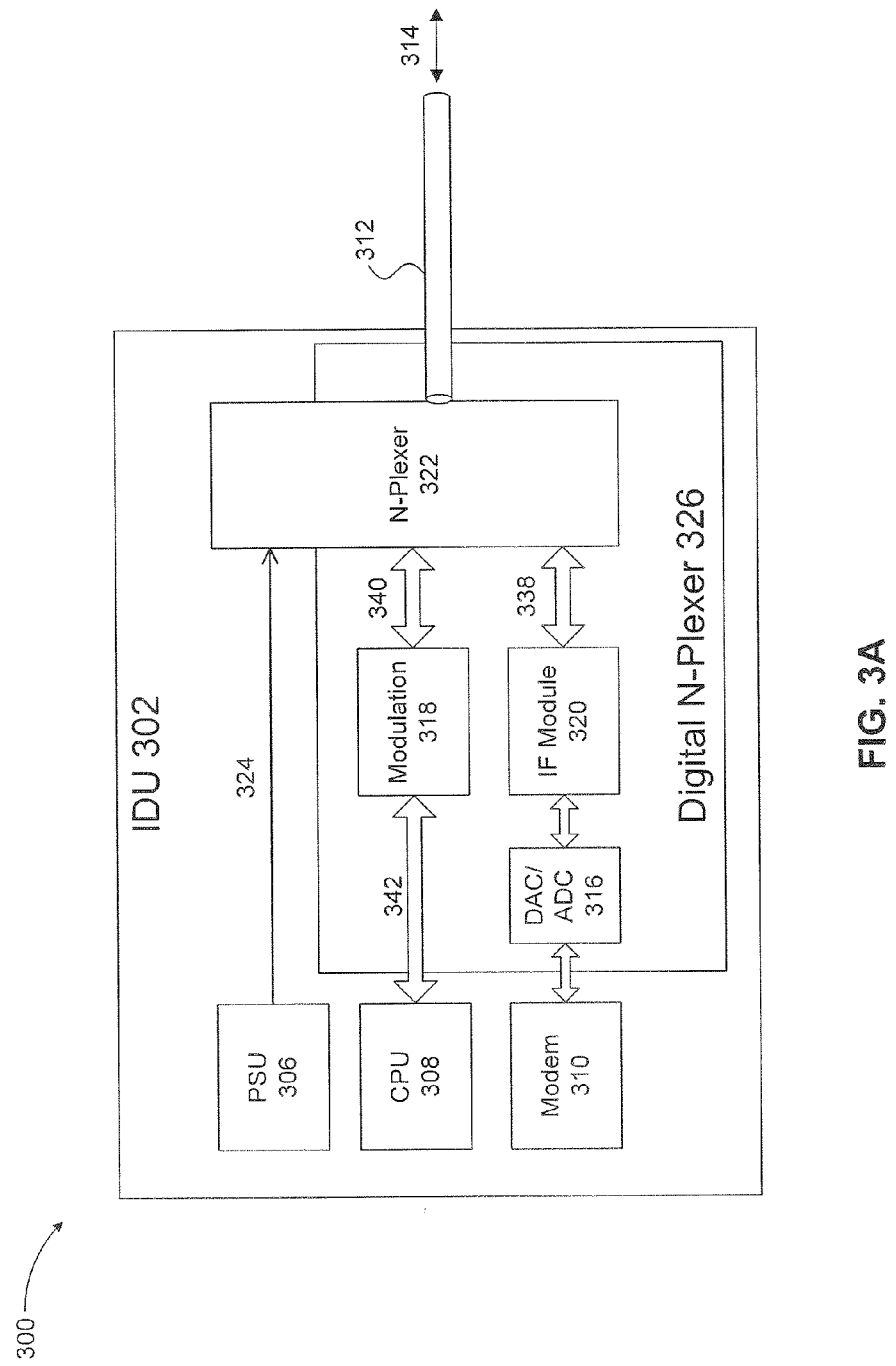
FIG. 3A illustrates a block diagram of an indoor communication unit (IDU) for implementation within a split microwave backhaul system according to an exemplary embodiment of the present disclosure.
Figure 3B:
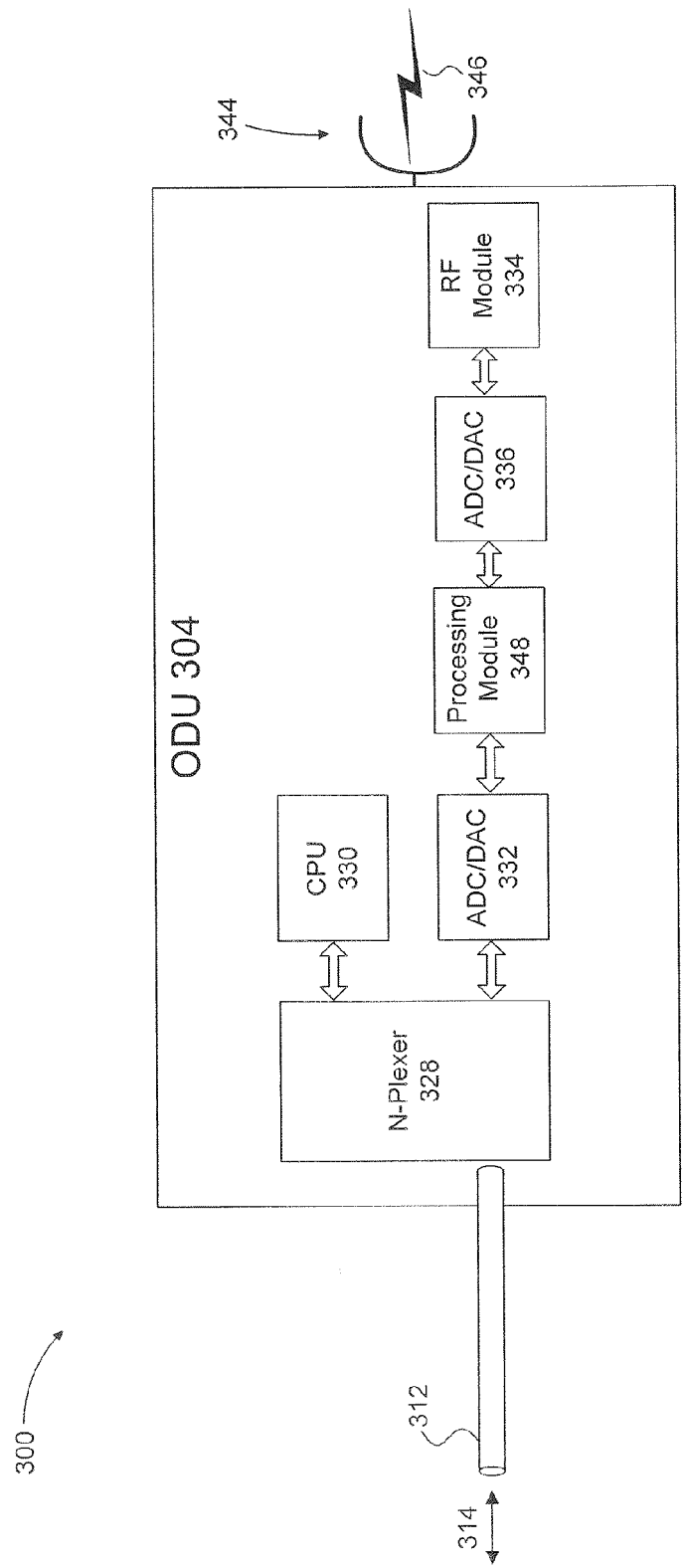
FIG. 3B illustrates a block diagram of an ODU for implementation within a split microwave backhaul system according to an exemplary embodiment of the present disclosure.

An Exemplary IDU and ODU for Implementation within a Split Microwave Backhaul System FIGS. 3A and 3B illustrate block diagrams of an indoor communication unit (IDU) 302 and an outdoor communication unit (ODU) 304, respectively, for use within a split microwave backhaul system 300 according to an exemplary embodiment of the present disclosure. IDU 302 and ODU 304 are coupled together via a communication pathway 312. IDU 302 can represent an exemplary embodiment of IDU 102 of FIG. 1A, and ODU 304 can represent an exemplary embodiment of ODU 104 of FIG. 1A.

IDU 302 includes a power supply unit (PSU) 306, a CPU 308, a modem assembly 310, a digital-to-analog converter/analog-to-digital converter (DAC/ADC) block 316, a modulation block 318, and an intermediate frequency (IF) module 320. In some embodiments, IDU 302 can also include an N-Plexer 322.

PSU 306 is configured to produce a DC output voltage 324. CPU 308 is configured to carry out instructions to perform arithmetical, logical, and/or input/output (I/O) operations of one or more of the aforementioned elements contained within IDU 302. In an embodiment, CPU 308 can control operation of modulation block 318 and N-Plexer 322.

Modem assembly 310 is configured to perform modulation and demodulation of data 314 that is to be transmitted between IDU 302 and ODU 304. In some embodiments, modem assembly 310 can function substantially similar to a baseband modem. Further, modem assembly 310 can be configured to cancel out noise associated with IDU 302 or communication pathway 312.

In some embodiments, modem assembly 310 can also be implemented as a dual channel modem. As will be discussed in greater detail below, when implemented as a dual channel modem, modem assembly 310 can facilitate relatively high capacity communication over wireless link 346. In particular, modem assembly 310 may allow wireless link 346 to have a link capacity that is approximately double the capacity of a wireless link associated with a conventional split ODU configuration. Thus, wireless link 346 may be a dual channel wireless link.

Additionally, modem assembly 310 can be configured to drive two communication channels over communication pathway 312 to ODU 304. Accordingly, when modem assembly 310 is operating as a dual channel modem, data 314 may comprise two communication channels. Therefore, communication pathway 312 can be a dual channel communication pathway, which can effectively double the capacity of split ODU microwave backhaul system 300.

In some embodiments, modem assembly 310 may also support channel bonding by combining two or more network interfaces to increase throughput. Modem assembly 310 can also be configured to support single chip cross polarization interference cancellation (XPIC) to increase the capacity of split ODU microwave backhaul system 300. Additionally, or alternatively, modem assembly 310 can be configured to support other double capacity configurations such as multiple-input and multiple-output (MIMO), spatial multiplexing, and radio optimized network planning, to provide some examples.

By implementing modem assembly 310 as a dual channel modem, ODU 310 may be configured to perform traffic and link optimization in the presence of a dual channel wireless link (e.g. wireless link 346). ODU 310 may perform this optimization by adaptively adjusting the modulations and code rates of transmissions across wireless link 346 for several different fading conditions. For example, ODU 310 may adaptively adjust the modulations and code rates of transmissions across wireless link 346 such that the transmission take place at a highest possible modulation and code rate in accordance with the quality of the external conditions of wireless link 346. ODU 310 may also adaptively adjust an output power of each of the two channels that comprise dual channel wireless link 346 for several different fading conditions. Therefore, under extreme external condition changes (e.g. a change from sunshine and clear skies to severe storm-like conditions), ODU 310 may allow for a hitless transition from communicating over two links with approximately 4096QAM modulation to communicating over a single link with a more robust modulation, such as QPSK, to provide some examples; however, other adaptive techniques are also possible.

DAC/ADC block 316 can be configured to transmit and/or receive data from modem assembly 310. DAC/ADC block 316 is also configured to perform digital-to-analog and/or analog-to-digital conversions of data 314 such that data 314 is suitable for transmission over communication pathway 312.

Modulation block 318 can be configured to transmit and/or receive a signal 342 from CPU 308. Modulation block 318 can also be configured to perform various modulation and/or demodulation techniques. In an embodiment, modulation block 318 can be configured to perform amplitude-shift keying. For example, modulation block 318 can be configured to perform amplitude-shift keying by utilizing a finite number of amplitudes, where each amplitude is assigned a unique pattern of binary digits. Each pattern can then be configured to form the specific symbol that is represented by the particular amplitude. Additionally, when modulation block 318 is configured to perform demodulation, modulation block 318 determines the amplitude of the received signal and maps the received signal back to the symbol it represents, thus recovering the original data.

IF module 320 can be configured to transmit and/or receive data from DAC/ADC block 316. IF module 320 is also configured to perform a frequency conversion of the received data such that data 314 is suitable for transmission over communication pathway 312. For example, IF module 320 can be configured to convert data 314 from baseband (BB), or near BB, to IF.

N-Plexer 322 can be configured to permit N-directional communication over communication pathway 312. In particular, N-Plexer 322 is configured to isolate IDU 302 from ODU 304, while permitting them to share a common antenna. N-Plexer 322 is also configured to receive DC output voltage 324 from PSU 306, to receive a control signal 340 (e.g. a Telemetry ASK signal) output from modulation block 318, and to receive an IF signal 338 output from IF module 320. Additionally, N-Plexer 322 can be configured to convert and/or combine each of these inputs to form data 314. N-Plexer 322 is also configured to transmit and/or receive data 314, over communication pathway 312, between IDU 302 and ODU 304. In an embodiment, N-Plexer 322 can function substantially as an analog duplexer (multiplexer/demultiplexer).

In some embodiments, communication pathway 312 can be a dual channel communication pathway, which can effectively double the capacity of microwave backhaul system 300. For example, the dual channel communication pathway can include a transmit pathway and a receive pathway, such that a portion of the bandwidth of the dual channel communication pathway is allocated into the transmit pathway to facilitate communication from IDU 302 to ODU 304, and a remaining portion of the bandwidth is allocated into the receive pathway to facilitate communication from the ODU 304 to the IDU 302. Additionally, or alternatively, dual channel communication pathway can include two bi-directional pathways that each facilitate communication between the same two IDUs and the same single ODU. For example, each bi-directional pathway can handle a portion of the overall bandwidth between the two IDUs and the single ODU, thereby effectively doubling the capacity of microwave backhaul system 300. However, a person having ordinary skill in the art will recognize that communication pathway 312 may be configured having other dual channel configurations without departing from the spirit and scope of the present disclosure.

In an exemplary embodiment, DAC/ADC block 316, modulation block 318, IF module 320 and N-Plexer 322 can be replaced by Digital N-Plexer 326. In particular, Digital N-Plexer 326 can be configured to multiplex/demultiplex the required signal in the digital domain, rather than in the analog domain. Therefore, Digital N-Plexer 326 can allow communication pathway 312 to be implemented as either a digital pathway or an analog pathway. Using Digital N-Plexer 326 may allow for a simpler implementation of IDU 302. For example, when implementing IDU 302 having Digital N-Plexer 326, no analog functionality would be required, and instead only a single digital chip substrate would be needed. As a result, the cost of implementing IDU 302 can be decreased. Additionally, using a Digital N-Plexer 326 can provide an improved yield, shorter production testing, lower assembly cost, lower peripheral component count, and can support greater distances between IDU 302 and ODU 304, to provide some examples.

As illustrated in FIG. 3B, ODU 304 can also include an N-Plexer 328, which can be implemented in several different manners. For example, N-Plexer 328 can be an analog N-Plexer, a digital N-Plexer, or a split function N-Plexer (e.g., where N-Plexer 328 is partially analog and partially digital). When N-Plexer 328 represents a digital N-Plexer, N-Plexer 328 can function in a substantially similar manner as Digital N-Plexer 326. In particular, N-Plexer 328 can be configured to multiplex/demultiplex signals in the digital domain. N-Plexer 328 also allows for a simpler implementation of ODU 304 because no analog functionality would be required, and instead only a single digital chip substrate would need to be implemented within ODU 304. Therefore, the cost of implementing ODU 304 can also be decreased.

ODU 304 can also include a CPU 330, analog-to-digital converter/digital-to-analog converter (ADC/DAC) blocks 332 and 336, a processing module 348, and an RF module 334. CPU 330 can be configured to function in a substantially similar manner as CPU 308. In particular, CPU 330 is configured to carry out instructions to perform arithmetical, logical, and/or I/O operations of one or more of the elements contained within ODU 304. In an embodiment, CPU 308 can control operation of N-Plexer 328.

ADC/DAC block 332 can be configured to transmit and/or receive data from N-Plexer 328. Both ADC/DAC blocks 332 and 336 are configured to perform analog-to-digital and/or digital-to-analog conversions of data 314 such that data 314 can be properly transmitted and/or received over wireless link 346.

Processing module 348 can be configured to preform mathematical manipulation techniques on data 314, such that data 314 may be modified or improved according to a desired processing method. For example, processing module 348 can be configured to measure, filter, or compress data 314 prior to being output to ADC/DAC block 336, such that data 314 can be adapted and transmitted over wireless link 346 according to the changing external conditions. The detailed functionality of processing module 348 will be discussed below with reference to FIG. 5.

RF module 334 can be configured to transmit and/or receive data from ADC/DAC block 336. RF module 334 is also configured to perform a frequency conversion of data 314 such that data 314 can be properly received over communication pathway 312. For example, when data 314 is received at RF module 334, data 314 can have a frequency residing in the IF range. Therefore, RF module 334 can up-convert data 314 from IF to RF such that data 314 can then be communicated over wireless link 346. RF module 334 can also be configured to down-convert a signal received over wireless link 346 from RF to IF such that the received signal can be transmitted over communication pathway 312 to IDU 302.

An Exemplary ODU for Implementation within an all ODU Microwave Backhaul System

Figure 4:
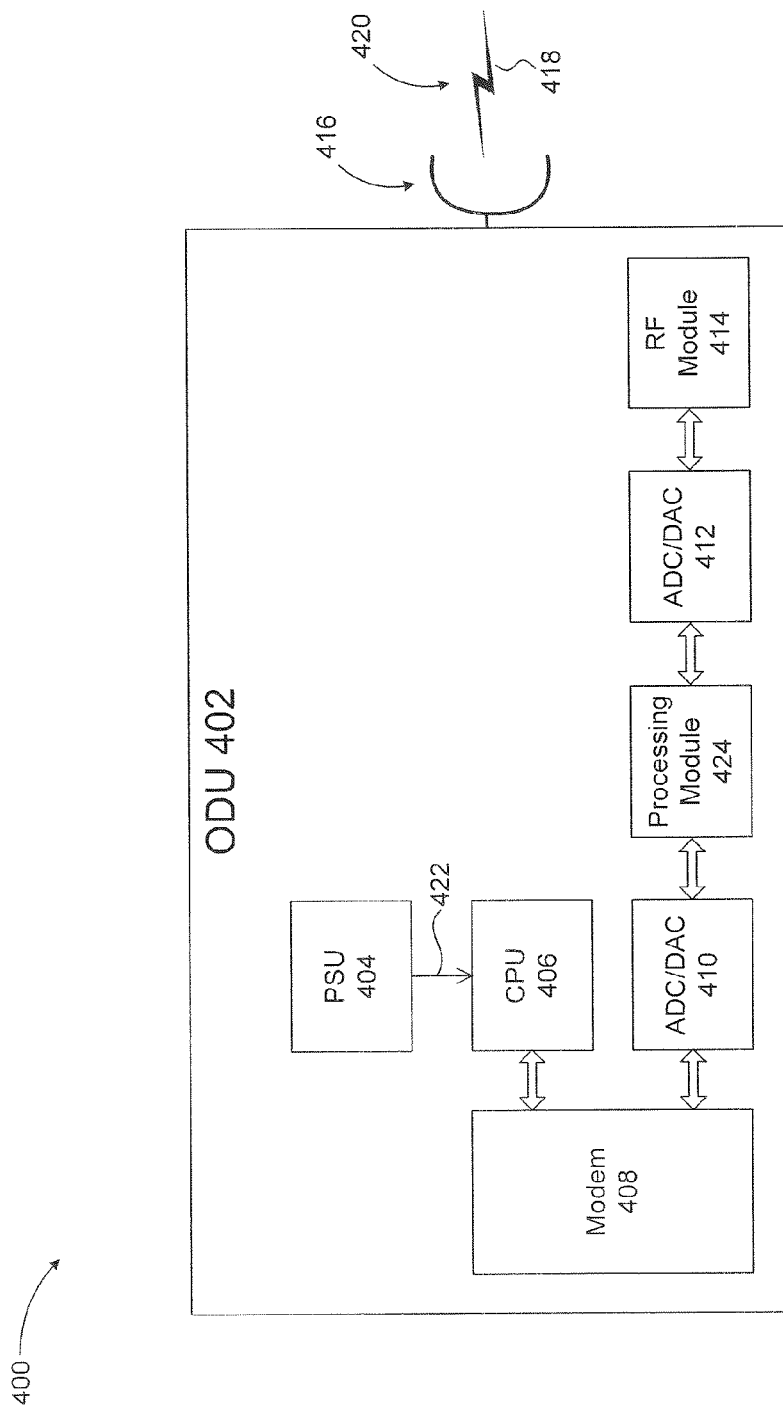
FIG. 4 illustrates a block diagram of an ODU for implementation within an all ODU microwave backhaul system according to an exemplary embodiment of the present disclosure.

FIG. 4 illustrates a block diagram of an ODU 402 for use within an all ODU microwave backhaul system 400 according to an exemplary embodiment of the present disclosure. ODU 402 can represent an exemplary embodiment of ODU 122 from FIG. 1B.

ODU 402 may include much of the same functionality as ODU 304 of FIG. 3B. Therefore, the description of these common features will be omitted from the discussion of ODU 402, and instead only the additional features with respect to ODU 304 will be discussed.

ODU 402 includes a power supply unit (PSU) 404, a CPU 406, a modem assembly 408, a processing module 424, analog-to-digital converter/digital-to-analog converter (ADC/DAC) blocks 410 and 412, and a radio frequency (RF) module 414. ODU 402 may also be connected to an antenna 416, and antenna 416 may facilitate communication of data 418 over a wireless link 420.

PSU 404 and CPU 406 may each function in a substantially similar manner to PSU 306 and CPU 308 of FIG. 3A, respectively. Additionally, CPU 406 can control operation of modem assembly 408.

Modem assembly 408 is configured to perform modulation and demodulation of data 418 that is to be transmitted, and received over wireless link 420. Similar to modem assembly 310 of FIG. 3A, in some embodiments, modem assembly 408 may be implemented as a dual channel baseband modem. Additionally, modem assembly 408 may be implemented as a flexible networking system-on-chip (SoC). Modem assembly 408 can also be configured to support several additional services, such as Ethernet, time-division multiplexing (TDM), and control data that is aggregated over a radio link, to provide some examples.

When implemented as a dual channel modem, modem assembly 408 can facilitate relatively high capacity communication over wireless link 420. In particular, modem assembly 408 may allow wireless link 420 to have a link capacity that is approximately double the capacity of a wireless link associated with a conventional all ODU configuration. Thus, wireless link 420 may be a dual channel wireless link. For example, modem assembly 408 can be configured to drive two communication channels through a single DAC/ADC block 412, such that the two communication channels can be transmitted and/or received over wireless link 420. Therefore, data 418 may comprise these two communication channels. In some embodiments, each of the two communication channels may support approximately 112 MHz wide channels, which is double the capacity for conventional microwave links.

Additionally, modem assembly 408's dual channel capabilities may allow ODU 402 to support a constellation of approximately 4096QAM; however, other QAM values are also possible. In some embodiments, modem assembly 408 may also support channel bonding by combining two or more network interfaces to increase throughput. Modem assembly 408 can also be configured to support single chip cross polarization interference cancellation (XPIC) to increase the capacity of wireless link 420. Additionally, or alternatively, modem assembly 408 can be configured to support other double capacity configurations such as multiple-input and multiple-output (MIMO), spatial multiplexing, and radio optimized network planning, to provide some examples. Further, modem assembly 408 can be configured to cancel out noise that may be associated with ODU 402 or wireless link 420.

By implementing modem assembly 408 as a dual channel modem, ODU 402 may be configured to perform traffic and link optimization in the presence of a dual channel wireless link (e.g. wireless link 420). ODU 402 may perform this optimization by adaptively adjusting the modulations and code rates of transmissions across wireless link 420 for several different fading conditions. ODU 402 may also adaptively adjust an output power of each of the two channels that comprise dual channel wireless link 420 for several different fading conditions. Therefore, under extreme external condition changes (e.g. a change from sunshine and clear skies to severe storm like conditions), ODU 402 may allow for a hitless transition from communicating over two links with approximately 4096QAM modulations to communicating over a single link with a more robust modulation, such as QPSK, to provide some examples; however, other adaptive techniques are also possible.

ADC/DAC block 410 can be configured to transmit and/or receive data from modem assembly 408. Both ADC/DAC blocks 410 and 412 are configured to perform analog-to-digital and/or digital-to-analog conversions of data 418 such that data 418 can be properly transmitted and/or received over wireless link 420.

Processing module 424 may function in a substantially similar manner to processing module 348, which will be discussed in greater detail below with respect to FIG. 5.

RF module 414 can be configured to transmit and/or receive data from ADC/DAC block 412. RF module 414 is also configured to perform a frequency conversion of data 418 such that data 418 can be properly communicated over wireless link 420. For example, when data 418 is received at RF module 414, data 418 can have a frequency residing in the baseband (BB) or near BB. Therefore, RF module 414 can up-convert data 418 from BB, or near BB, to RF such that data 418 can then be communicated over wireless link 420. RF module 414 can also be configured to down-convert a signal received over wireless link 420, from RF to BB, or near BB, such that the received signal can be properly communicated to modem assembly 408.

An Exemplary Processing Module for Implementation within an ODU

As discussed above, ODUs 304 and 402 may be configured to perform traffic and link optimization in the presence of a dual channel wireless link (e.g. wireless links 346 and 420, respectively). However, optimization of two links may present new challenges in comparison to performing ACM on a wireless link that comprises only a single channel.

One particular challenge may result from the fact that an output power of the two channels that comprise the dual channel wireless link may each highly depend on European Telecommunications Standards Institute (ETSI) standards. For example, concurrent transmissions of the two channels that comprise the dual channel wireless link can cause interference due to third-order inter-modulation distortion (IM3). This interference may degrade the link performance and throughput of the dual channel wireless link (e.g. wireless links 346 or 420), and may also desensitize the ODU (e.g. ODU 304 or 402). In particular, concurrent transmissions of the two channels, which comprise the dual channel wireless link, at a minimal frequency separation may cause IM3 due to energy from one channel leaking into the other channel. The IM3 produced by these concurrent transmissions may cause the ODU to violate the Federal Communications Commission (FCC) spectrum mask, as well as violate spurious emission ETSI requirements.

Another challenge is that RF impairments may result when the ODU switches from two links with approximately 4096QAM modulation to a single link with a more robust modulation, such as QPSK, to provide some examples. Additionally, cross channel impairments that may exist in the presence of a dual channel wireless link, and that do not exist in single channel wireless links, need to be tracked in order to allow for hitless switching between transmitting over two links, and transmitting only over a single link. Further challenges can also result when transmissions over two links occur non-symmetrically. For example, if each of the two links have different parameters, such as code rates, modulations, output powers, spectral masks, bandwidths, or the like, then additional impairments may result.

Accordingly, as will be discussed below, ODUs 304 and 402 may be implemented having processing modules 348 and 424, respectively, each of which may be configured to perform certain functions to allow for hitless modulation changes in wireless links 346 and 420, respectively, in response to varying external conditions (e.g. hitless ACM).

Figure 5:
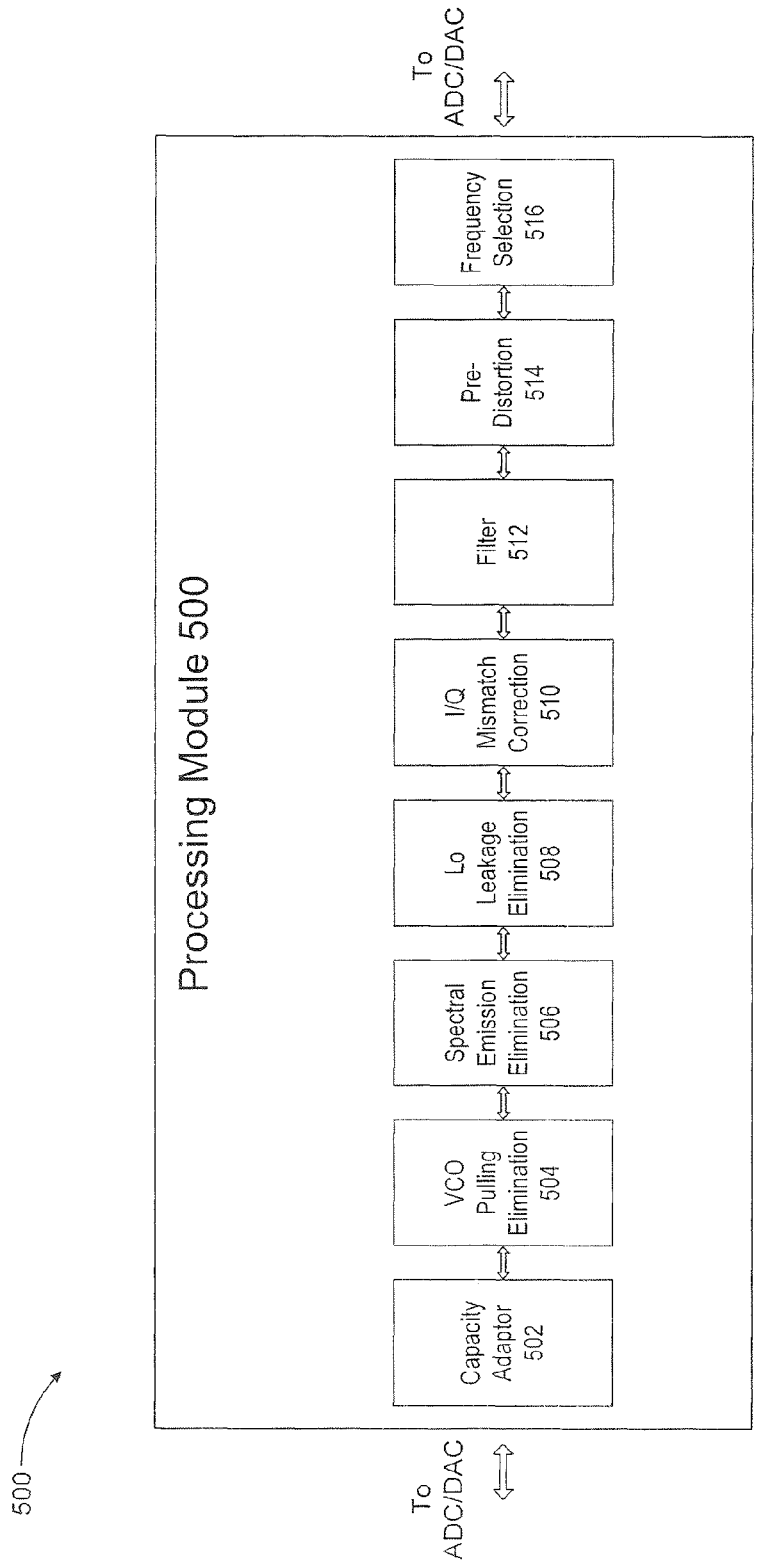
FIG. 5 illustrates a block diagram of a processing module for implementation within an ODU according to an exemplary embodiment of the present disclosure.

FIG. 5 illustrates a block diagram of a processing module 500 for implementation within an ODU according to an exemplary embodiment of the present disclosure. Processing module 500 may represent an exemplary embodiment of processing module 348 from FIG. 3B or processing module 424 from FIG. 4. Processing module 500 includes a capacity adaptor 502, a voltage controller oscillator (VCO) pulling elimination block 504, a spectral emission elimination block 506, a local oscillator (LO) leakage elimination block 508, an I/Q mismatch correction block 510, a filter 512, a pre-distortion block 514 and a frequency selection block 516.

In an embodiment, processing module 500 may be disposed between ADC/DAC block 332 and ADC/DAC block 336, as shown in FIG. 2B. Additionally, or alternatively, processing module 500 may be disposed between ADC/DAC block 410 and ADC/DAC block 412, as shown in FIG. 4. However, for illustrative purposes only, processing module 500 will be discussed as though it is being disposed between ADC/DAC block 332 and ADC/DAC block 336, as shown in FIG. 2B. In particular, ADC/DAC block 332 may be configured to receive an analog signal and to convert the analog signal into a digital signal. ADC/DAC block 332 may then output the digital signal to processing module 500.

Processing module 500 may function to counteract the effects caused by an increase in link attenuation. In particular, processing module 500 may be configured to perform various optimization techniques by adaptively adjusting the modulations and code rates of transmissions across wireless link 346 or wireless link 420 for several different fading conditions. ODU 304, or ODU 402, may also adaptively adjust an output power of each of the two channels that comprise dual channel wireless link 346 or wireless link 420, respectively, for several different fading conditions. For example, as link attenuation increases, processing module 500 may increase an output power for the two channels that comprise dual channel wireless link 346 or wireless link 420 to overcome fading. In some embodiments, the output power of only one of the two channels may be increased. Alternatively, the output power of both channels that comprise dual channel wireless link 346 or wireless link 420 may be increased, and each channel may experience the same increase in power, or each channel may be increased by different factors.

However, in some embodiments, the ODU may become limited by the output power of each of the two channels. Therefore, processing module 500 may be configured to switch from transmitting over the two channels (e.g. dual channel mode) to only transmitting over a single channel (e.g. single channel mode). In some embodiments, single channel mode may allow for communication over relatively long distances and may provide relatively high link availability, while dual channel mode may provide for relatively high capacity communication but may offer a slightly lower link availability then with single channel mode. Switching from dual channel mode to single channel mode may allow the ODU to transmit at a higher output power over the single channel than was possible in the dual channel mode. Other scenarios may also arise where a switch from dual channel mode to single channel mode may be necessary. For example, the ODU may switch from dual channel mode to single channel mode to facilitate optimal modulation and coding rates.

Accordingly, the functional elements discussed below are each configured such that processing module 500 is capable of adaptively switching between dual channel mode and single channel mode, when external conditions warrant such a change, without incurring any signal loses (e.g. hitless ACM). Accordingly, ODUs 304 or 402 may also be include a transmitter and a receiver, which may allow for the detection of the external conditions surrounding wireless link 346 or 420, such that communications across the link can be adapted accordingly. For example, the external channel conditions may be detected by the receiver, and may then be utilized by processing module 500 to produce an adapted signal that is optimized given the detected external conditions. The optimized signal may then be sent to the transmitter such that the signal may then be transmitted across wireless link 346 or 420.

Capacity adaptor 502 can be configured to gradually adapt a channel capacity of the wireless link in response to changing external conditions. For example, capacity adaptor 502 may adjust the channel capacity by changing a modulation and/or coding rate of the wireless link between low and high bit rates. As discussed above, a switch between dual channel and single channel modes may be caused by changing external conditions, and that some signal loses (e.g. hits) may occur during this switch. In some embodiments, the number of signal hits may represent the bit error rate (BER) of the wireless link. BER represents the number of received bits of a data stream over a communication channel that have been altered due to factors such as noise, interference, distortion or bit synchronization errors, to provide some examples. These signal hits may cause the modem (located either in the ODU or IDU) to lose synchronization, which may result in a sudden drop in transmission capacity. However, by gradually adapting the channel capacity of the wireless link, these signal loses may be substantially eliminated.

VCO pulling elimination block 504 may be configured to substantially eliminate VCO pulling within the ODU. In particular, VCO pulling elimination block 504 may either ramp down or ramp up one of the two channels while also gradually changing the average power. This may reduce parasitic effects, which may correspondingly substantially eliminate VCO pulling. Again, this operation may be necessitated by a switch between dual channel and single channel modes. For example, when switching between dual channel and single channel modes, the peak to average voltage of the transmitted signal may suddenly change, which may cause a power consumption drop in the power amplifier. Accordingly, this power consumption drop may cause VCO pulling. However, by implementing VCO pulling elimination block 504, this VCO pulling can be substantially eliminated.

Spectral emission elimination block 506 may be configured to substantially eliminate spectral emissions. When a switch between dual channel and single channel modes occurs, the ODU may experience a sudden power change, which may result in spectral emissions. These spectral emissions may violate various communication standards (e.g. ETSI standards). Thus, spectral emission elimination block 506 may substantially eliminate these spectral emissions by performing one of several different techniques. For example, spectral emission elimination block 506 may perform a complementary output power ramp up/down technique on each of the two channels that comprise the dual channel wireless link. This ramp up/down technique will cause a corresponding change in modulation, which may then allow a smooth transition in both capacity and peak to average voltage. Additionally, or alternatively, spectral emission elimination block 506 may perform a substantially instantaneous change between dual channel and single channel mode such that when the power is shut down in the second channel, power will be substantially simultaneously increased in the first channel to maintain substantially the same power. Using this substantially instantaneous changing technique, the ODU will experience substantially the same output/input power, thus allowing the ODU to avoid transitions in power levels. In some embodiments, the substantially instantaneous changing technique may be implemented when an envelope of each of the signals transmitted across each of the two channels is low.

LO leakage elimination block 508 may be configured to substantially eliminate LO leakage. When the modem (either located in the ODU or the IDU) switches between one and two channels, it may generate unwanted DC offset, which may result in LO leakage. Therefore, LO leakage elimination block 508 may be configured to substantially eliminate LO leakage by performing one of several different techniques. For example, LO leakage elimination block 508 may implement a ramp up/down technique, similar to the technique implemented by spectral emission elimination block 506. Additionally, or alternatively, LO leakage elimination block 508 may generate and calibrate DC offset while a switch between dual channel and single channel mode is taking place. Further, LO leakage elimination block 508 may be configured to hide the LO leakage within one of the two channels, and swap the LO leakage into the opposite channel during the switch between dual channel and single channel modes. Each of these techniques may be implemented by LO leakage elimination block 508 to substantially eliminate LO leakage.

I/Q mismatch correction block 510 may be configured to adaptively correct I/Q mismatch. When switching between dual channel and signal channel modes, an envelope of each of the two signals may change, which may result in an I/Q mismatch. Accordingly, I/Q mismatch correct block 510 may be configured to correct the I/Q mismatch, and avoid generating unwanted image signals, by gradually adapting to the new envelopes.

Filter 512 may be configured to filter out noise (spurs or quantization) from the digital domain such that an output of the ODU may be improved. For example, filter 512 may include at least one of a baseband filter, a wideband filter and a narrowband filter. Additionally, filter 512 may be configured to adaptively change between each of these filter types.

Pre-distortion block 514 may be configured to recognize a switch between dual channel and single channel modes, and to gradually update digital pre-distortion coefficients accordingly. Additionally, when the ODU is operating in dual channel mode, pre-distortion block 514 may be implemented to substantially eliminate intermodulation of the two channels. Alternatively, when the ODU is operating in single channel mode, pre-distortion block 514 may be implemented to substantially eliminate in-band non-linearity products. In some embodiments, pre-distortion block 514 may be configured to optimize out-of-band products and in-band products after it gradually updates the digital pre-distortion coefficients.

Frequency selection block 516 may be configured to monitor a performance of each of the two channels that comprise the dual channel wireless link. In particular, frequency selection block 516 may monitor the frequency selective fading of each of the two channels. Even when fading occurs, frequency selection block 516 may adaptively select which of the two channels is the most optimal for transmitting. Therefore, if frequency selection block 516 identifies that a chosen channel is beginning to experience significant attenuation, frequency selection block 516 may then choose to switch to the opposite channel for transmitting the signal.

ADC/DAC block 336 may be configured to receive the processed digital signal output from processing module 500, and to convert the processed digital signal into an analog signal, such that the analog signal may be communicated over the wireless link according to the processing techniques implemented by processing module 500.

An Exemplary Dual Channel Wireless Link with Hitless ACM

FIG. 6A illustrates a block diagram of a microwave backhaul system 600 that includes first and second ODUs 602 and 604, first and second antennas 606 and 608, and a dual channel wireless link 610 according to an exemplary embodiment of the present disclosure. ODUs 602 and 604 can each represent an exemplary embodiment of any of the aforementioned ODUs (e.g. ODUs 104, ODU 122, ODU 304 or ODU 402). Although microwave backhaul system 600 is depicted without IDUs (e.g. an all ODU microwave backhaul system), microwave backhaul system 600 can also be a split ODU microwave backhaul system without departing from the spirit and scope of the present disclosure.

As discussed above, a modem assembly may be implemented within both ODU 602 and ODU 604. Additionally, the modem assemblies may each be dual channel baseband modems such that the modem assemblies can facilitate relatively high capacity communication over dual channel wireless link 610. In particular, the modem assemblies may allow dual channel wireless link 610 to have a link capacity that is approximately double the capacity of a wireless link associated with conventional all ODU (or split ODU) configurations. For example, when the modem assemblies are operating as dual channel modems, dual channel wireless link 610 may comprise two communication channels 612 and 614. Accordingly, communication channels 612 and 614 may be implemented as two adjacent channels or two non-adjacent channels, to provide some examples. In some embodiments, communication channels 612 and 614 may each support an approximately 112 MHz wide channel, which is double the capacity for conventional microwave links.

In some embodiments, the two communication channels 612 and 614 may not be completely independent from one another. Implementing channels 612 and 614 such that they are interdependent allows for each of the two channels to be appropriately adapted to the varying external conditions, as well as the current performance of the other channel. This implementation scheme may be in direct contrast to conventional double capacity systems (e.g. cross polarization) where the two channels are generally independent of one another, and are thus typically incapable of performing system optimization techniques.

Therefore, using the principles outlined above, a single radio hardware (e.g. ODU 602 or ODU 604) may be configured to transmit two channels 612 and 614 over the same air interface (e.g. dual channel wireless link 610). As shown in FIG. 6A, during transmission of data from either ODU 602 or ODU 604, the two channels 612 and 614 may be represented as TX1 and TX2, and during receipt of the data from either ODU 602 or ODU 604, the two channels 612 and 614 may be represented as RX1 and RX2. Additionally, channels 612 and 614 which comprise dual channel wireless link 610, do not need to be adjacent to one another in the standard duplexer frequency range. In particular, the two channels can be transmitted and/or received at any frequency within the standard duplexer frequency range. In some embodiments, communication of channels 612 and 614 over dual channel wireless link 610 may be facilitated by ensuring that the two channels (TX1 and TX2, or RX1 and RX2) have sufficient frequency separation (shown as "separation" in FIG. 6A). For example, sufficient frequency separation may be achieved by performing frequency division duplex (FDD)-based communication; however, other frequency separation schemes are also possible.

In an embodiment, ODU 602 may be configured to process data to produce two separate communication channels TX1 and TX2. ODU 602 may then transmit TX1 and TX2 to antenna 606, which may then transmit TX1 and TX2 over dual channel wireless link 610. TX1 and TX2 may be transmitted such that the two channels 612 and 614 have a predetermined bandwidth (BW) and frequency separation (separation) to ensure that the data will be properly transmitted over dual channel wireless link 610 (e.g. without incurring any significant interference or distortion). TX1 and TX2 may be transmitted over dual channel wireless link 610 according to numerous different transmission schemes, such as cross polarization, to provide an example. The data may then be received at antenna 608 as channels RX1 and RX2. Upon receipt, antenna 608 may then transmit RX1 and RX2 to ODU 604, such that ODU 604 may combine and process RX1 and RX2 to recreate the original data.

As illustrated in FIG. 6A, microwave backhaul system 600 may be experiencing good external conditions (e.g. sunshine and clear skies). Therefore, as discussed above, both ODUs 602 and 604 may be operating in dual channel mode. Accordingly, data may be communicated between ODUs 602 and 604 over the two communication channels 612 and 614 at a relatively high modulation of approximately 4096QAM, or approximately 1024QAM. In some embodiments, microwave backhaul system 600 may be implemented such that communication channel 612 has a relatively high output power and communication channel 614 has a relatively low output power.

FIG. 6B illustrates a block diagram of a microwave backhaul system 620 that includes first and second ODUs 622 and 624, first and second antennas 626 and 628, and a dual channel wireless link 630 according to an exemplary embodiment of the present disclosure. ODUs 622 and 624 can each represent an exemplary embodiment of any of the aforementioned ODUs (e.g. ODUs 104, ODU 122, ODU 304 or ODU 402). Although microwave backhaul system 620 is depicted without IDUs (e.g. an all ODU microwave backhaul system), microwave backhaul system 620 can also be a split ODU microwave backhaul system without departing from the spirit and scope of the present disclosure.

In contrast to FIG. 6A, FIG. 6B illustrates that microwave backhaul system 620 may be experiencing poor external conditions (e.g. wind, rain, hail, stormy conditions, or the like). Therefore, as discussed above, both ODUs 622 and 624 may switch from a dual channel mode to a single channel mode. ODUs 622 and 624 may each include a processing module (e.g. processing module 500) configured to perform a hitless ACM technique such that signal hits are substantially avoided when switching from dual channel mode to single channel mode. Accordingly, data may only be communicated between ODUs 602 and 604 over a single channel 632. As discussed above, by switching to a single channel, ODUs 622 and 624 may be able to transmit the data using a higher output power than was possible with two channels. Additionally, ODUs 622 and 624 may be configured to reduce the modulation of the data transmitted over the single channel 632 to a more robust modulation, such as QPSK to provide an example. Each of these measures may allow ODUs 622 and 624 to compensate for the poor external conditions and the increase in link attenuation.

Although FIGS. 6A and 6B illustrate a switch from two communication channels to a single communication channel as a means for compensating for poor external conditions and an increase in link attenuation, other compensation measures are also possible. For example, one of the two channels may be designated as a "master" channel and the other channel as a "slave" channel. The master channel can then be a full performance channel, while the slave channel can be a low performance channel.

An Exemplary Method of Optimizing a Transmission of Data Over a Dual Channel Wireless Link FIG. 7 is a flowchart of exemplary operational steps of optimizing a transmission of data over a dual channel wireless link in response to changing external conditions according to an exemplary embodiment of the present disclosure. The flowchart of FIG. 7 is described with reference to embodiments of FIGS. 1-6. However, a method 700 is not limited to these embodiments.

Method 700 begins at step 702 where data, such as data 418 to provide an example, is received at an ODU, such as ODU 402 to provide an example. The data can be received at ODU 402 from an IDU, such as IDU 302 to provide an example, or the data can be received directly from a core network (e.g. an all ODU configuration).

In step 704, the data is modulated/demodulated using a dual channel modem assembly, such as modem assembly 408 to provide an example. Additionally, the modem assembly may be configured to drive the data over a dual channel wireless link, such as dual channel wireless link 420 to provide an example.

In step 706, the data is converted from the analog domain to the digital domain.

In step 708, an external weather condition is detected. Additionally, a performance level of each of the two communication channels that comprise the dual channel wireless link is also detected.

In step 710, a decision is made as to whether the detected external weather condition and/or the performance levels of the two communication channels are good. If the external weather condition and/or the performance levels of the two communication channels are good, then the method proceeds to step 712. However, if the external weather condition and/or the performance levels of the two communication channels are poor, then the method proceeds to step 714.

In step 712, a characteristic of the data and/or a characteristic of the dual channel wireless link are adjusted such that transmission of the data over the dual channel wireless link is optimized given the good external weather condition and/or performance levels. In particular, the characteristic of the data and of the dual channel wireless link are adaptively adjusted using a hitless adaptive coding modulation (ACM) technique to optimize the transmission of the data over the dual channel wireless link. This hitless ACM technique may allow for adjusts of the characteristic of the data and of the dual channel wireless link without incurring any substantial signal loses or bit errors. For example, a processing module, such as processing module 500 to provide an example, may adaptively adjust the data such that the data is transmitted over the dual channel wireless link at a relatively high modulation and code rate (e.g. 4096 QAM). Additionally, or alternatively, the processing module may adaptively adjust the dual channel wireless link such that both channels are operational (e.g. dual channel mode) and such that the data is transmitted over both of the communication channels that comprise the dual channel wireless link. In some embodiments, the processing module may adaptively adjust the dual channel wireless link such that the data is transmitted at a relatively low output power.

In step 714, a characteristic of the data and/or a characteristic of the dual channel wireless link are adjusted such that transmission of the data over the dual channel wireless link is optimized given the poor external weather condition and/or performance levels. In particular, the characteristic of the data and of the dual channel wireless link are adaptively adjusted using the hitless ACM technique to optimize the transmission of the data over the dual channel wireless link. For example, the processing module may adaptively adjust the data such that the data is transmitted over the dual channel wireless link at a relatively robust modulation and code rate (e.g. QPSK). Additionally, or alternatively, the processing module may adaptively adjust the dual channel wireless link such that only one channel is operational (e.g. single channel mode) and such that the data is transmitted only over one of the communication channels that comprise the dual channel wireless link. In some embodiments, the processing module may adaptively adjust the dual channel wireless link such that the data is transmitted at a relatively high output power.

In step 716, an RF module, such as RF module 414 to provide an example, upconverts the data from BB, near BB, or IF to RF such that the data can be properly communicated over the dual channel wireless link.

In step 718, the adjusted data is communicated over the dual channel wireless link from a common antenna. In particular, the adaptively adjusted data may be transmitted over the of dual channel wireless link in a manner that will optimize link availability, link capacity, and output power during the transmission given the detected external weather condition and/or the performance levels of the two communication channels.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. An outdoor communication unit (ODU) for implementation within a dual channel microwave backhaul system, and having digital capabilities, comprising:

an RF module configured to perform frequency conversions of data;

a conversion block configured to convert the data between an analog domain and a digital domain;

a dual channel modem assembly configured to modulate/demodulate the data and to drive the data over a dual channel wireless link included within the dual channel microwave backhaul system; and a processing module configured to adaptively adjust a characteristic of the data to correct errors in the data, and to adaptively adjust a characteristic of the dual channel wireless link according to a detected condition using an adaptive coding modulation (ACM) technique, and to facilitate a transmission of the data over the dual channel wireless link by performing a mathematical manipulation technique on the data, wherein the characteristic of the data is adaptively adjusted in the digital domain.

2. The ODU of claim 1, wherein the detected condition includes at least one of: an external weather condition and a performance level of each of a first communication channel and a second communication channel of the dual channel wireless link.

3. The ODU of claim 2, wherein the characteristic of the data includes at least one of: a modulation and a code rate, and wherein the characteristic of the dual channel wireless link includes at least one of: an output power and an operational mode of each of the first and second communication channels.

4. The ODU of claim 3, wherein the processing module is configured to facilitate the transmission of the data at a high modulation and code rate when the detected condition is good, and to facilitate the transmission of the data at a low modulation and code rate when the detected condition is poor.

5. The ODU of claim 4, wherein the high modulation is approximately 4096 quadrature amplitude modulation (QAM), and wherein the low modulation is approximately quadrature phase-shift keying (QPSK).

6. The ODU of claim 3, wherein the processing module is configured to facilitate the transmission of the data over both the first and second communication channels when the detected condition is good, and to facilitate the transmission of the data over only the first communication channel when the detected condition is poor.

7. The ODU of claim 6, wherein the processing module is configured to facilitate the transmission of the data at a low output power when the detected condition is good, and to facilitate the transmission of the data at a high output power when the detected condition is poor.

8. The ODU of claim 3, wherein the ACM technique comprises: adaptively adjusting the characteristic of the data and of the dual channel wireless link without incurring any substantial signal losses.

9. The ODU of claim 2, wherein the first communication channel is a "master" channel having full performance capabilities, and wherein the second communication channel is a "slave" channel having low performance capabilities.

10. The ODU of claim 2, wherein the first and second communication channels are interdependent.

11. The ODU of claim 2, wherein the first and second communication channels have different characteristics and wherein the data transmitted over each of the first and second communication channels have different characteristics.

12. The ODU of claim 1, wherein the dual channel microwave backhaul system is a dual channel split ODU microwave backhaul system.

13. The ODU of claim 1, and wherein the dual channel microwave backhaul system is a dual channel all ODU microwave backhaul system.

14. The ODU of claim 13, wherein the dual channel modem assembly is further configured to support at least one of: single chip cross polarization interference cancellation (XPIC), multiple-input and multiple-output (MIMO), spatial multiplexing, and radio optimized network planning.

15. The ODU of claim 1, wherein the mathematical manipulation technique performed by the processing module comprises at least one of: a capacity adapting process, a voltage controller oscillator (VCO) pulling elimination process, a spectral emission elimination process, a local oscillator (LO) leakage elimination process, an I/Q mismatch correction process, a filtering process, a pre-distortion process, and a frequency selection process.

16. A processing module for implementation within an outdoor communication unit (ODU), wherein the processing module is configured to adaptively adjust a transmission characteristic, according to a detected condition, using an adaptive coding modulation (ACM) technique, comprising:
 a capacity adaptor configured to substantially eliminate signal losses by adapting a channel capacity of a dual channel wireless link in response to the detected condition; and
 one or more processors configured to:
 substantially eliminate VCO pulling within the ODU by ramping down/up a first communication channel of the dual channel wireless link;
 substantially eliminate spectral emissions by performing at least one of: a complementary output power ramp up/down technique on the first communication channel and a second communication channel that comprise the dual channel wireless link, and a substantially instantaneous changing technique between a dual channel mode and a single channel mode;
 substantially eliminate LO leakage, and to generate and calibrate DC offset when a switch between the dual channel and single channel mode is taking place;
 adaptively correct I/Q mismatch;
 substantially remove noise from a digital domain to improve an output of the ODU;
 recognize the switch between the dual channel and single channel modes, and to gradually update digital pre-distortion coefficients accordingly;
 substantially eliminate intermodulation of the first and second communication channels when the ODU is operating in the dual channel mode;
 substantially eliminate in-band non-linearity products when the ODU is operating in the single channel mode; and
 monitor a frequency selective fading of each of the first and second communication channels, and to adaptively select which of the first and second communication channels is most optimal for transmitting when fading occurs.

17. A method of optimizing a transmission of data over a dual channel wireless link having a first communication channel and a second communication channel, comprising:
 detecting, at an outdoor communication unit (ODU), an external weather condition and a performance level of each of the first and second communication channels;
 adaptively adjusting, at the ODU, a characteristic of the data and a characteristic of the dual channel wireless link according to the detected external weather condition and the detected performance level of each of the first and second communication channels using an adaptive coding modulation (ACM) technique;
 modulating/demodulating the data at the ODU;
 performing, at the ODU, a mathematical manipulation technique on the data; and
 driving, at the ODU, the data over the dual channel wireless link, wherein the ODU and the dual channel wireless link are included within a dual channel microwave backhaul system.

18. The method of claim 17, wherein the characteristic of the data includes at least one of: a modulation and a code rate, and wherein the characteristic of the dual channel wireless link includes at least one of: an output power and an operational mode of each of the first and second communication channels.

19. The method of claim 18, wherein the ACM technique includes adaptively adjusting the characteristic of the data and of the dual channel wireless link without incurring any substantial signal losses.

20. The method of claim 19, wherein the mathematical manipulation technique includes at least one of: a capacity adapting process, a voltage controller oscillator (VCO) pulling elimination process, a spectral emission elimination process, a local oscillator (LO) leakage elimination process, an I/Q mismatch correction process, a filtering process, a pre-distortion process, and a frequency selection process.

21. The method of claim 17, wherein the detecting the performance level of each of the first and second communication channels comprises detecting a bit error rate (BER) of each of the first and second communication channels.

\* \* \* \* \*

UNITED STATES PATENT AND TRADEMARK OFFICE
CERTIFICATE OF CORRECTION

PATENT NO.        : 9,071,393 B2                                      Page 1 of 1
APPLICATION NO.   : 13/733519
DATED             : June 30, 2015
INVENTOR(S)       : Sturkovich et al.

It is certified that error appears in the above-identified patent and that said Letters Patent is hereby corrected as shown below:

In the claims

In column 21, line 54, delete "and".

Signed and Sealed this
Twenty-second Day of December, 2015

Michelle K. Lee
*Director of the United States Patent and Trademark Office*